(12) United States Patent
Goto et al.

(10) Patent No.: US 10,818,954 B2
(45) Date of Patent: Oct. 27, 2020

(54) ELECTRICAL COMPONENT CONNECTION MECHANISM OF FUEL CELL STACK AND FUEL CELL STACK

(71) Applicant: HONDA MOTOR CO., LTD., Tokyo (JP)

(72) Inventors: Yusuke Goto, Wako (JP); Hiroo Yamaguchi, Wako (JP); Daisuke Hanaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1104 days.

(21) Appl. No.: 14/817,211

(22) Filed: Aug. 4, 2015

(65) Prior Publication Data

US 2016/0043427 A1 Feb. 11, 2016

(30) Foreign Application Priority Data

Aug. 6, 2014 (JP) ................. 2014-160056

(51) Int. Cl.
*H01M 8/2465* (2016.01)
*B60L 50/71* (2019.01)

(52) U.S. Cl.
CPC .......... *H01M 8/2465* (2013.01); *B60L 50/71* (2019.02); *H01M 2250/20* (2013.01); *Y02T 90/40* (2013.01)

(58) Field of Classification Search
CPC ...... H01M 8/248; H01M 8/2465; B60L 50/71
USPC ....................................... 429/452
See application file for complete search history.

(56) References Cited

U.S. PATENT DOCUMENTS

2008/0182151 A1\* 7/2008 Mizusaki ............ H01M 8/0247
429/457
2012/0129069 A1\* 5/2012 Hotta ................. H01M 8/04552
429/452

FOREIGN PATENT DOCUMENTS

JP 2002-370544 12/2002
JP 2008-103166 5/2008
JP 2010-251166 11/2010

OTHER PUBLICATIONS

Machine Translation of Mizusaki Kimiharu et al. (JP 2010251166A) "Fuel Cell Stack", 2010, pp. 1-13 (Year: 2010).\*
Japanese Office Action for corresponding JP Application No. 2014-160056, dated Jan. 10, 2017 (w/ English machine translation).

\* cited by examiner

*Primary Examiner* — Stewart A Fraser
(74) *Attorney, Agent, or Firm* — Mori & Ward, LLP (57) ABSTRACT

An electric component connection mechanism of a fuel cell stack includes a fuel cell stack body, terminal plates, end plates, and a housing. A plurality of fuel cells that generate electricity by electrochemical reaction of a fuel gas and an oxidant gas are stacked in the fuel cell stack body. The terminal plates are disposed on both ends of the fuel cell stack body in a stacking direction of the fuel cells. The end plates are stacked on the terminal plates on the sides opposite to the fuel cell stack body. The terminal plates include terminals that penetrate through and protrude out of the end plates. The terminals are connected to high-voltage cables. Moving mechanisms that support the terminal plates while allowing the terminal plates to advance and retreat in the stacking direction with respect to the end plates are provided.

8 Claims, 7 Drawing Sheets

ELECTRICAL COMPONENT CONNECTION MECHANISM OF FUEL CELL STACK AND FUEL CELL STACK

CROSS-REFERENCE TO RELATED APPLICATIONS

The present application claims priority under 35 U.S.C. § 119 to Japanese Patent Application No. 2014-160056, filed Aug. 6, 2014, entitled "Electrical Component Connection Mechanism of Fuel Cell Stack." The contents of this application are incorporated herein by reference in their entirety.

BACKGROUND

1. Field

The present disclosure relates to an electrical component connection mechanism of a fuel cell stack and a fuel cell stack.

2. Description of the Related Art

For example, a solid polymer electrolyte fuel cell includes an electrolyte membrane-electrode structure (MEA) in which an anode electrode is disposed on one surface side of an electrolyte film constituted by a polymer ion-exchange membrane and a cathode electrode is disposed on the other surface side thereof. The electrolyte membrane-electrode structure is held between separators and constitutes a power generation cell. Typically, the fuel cell is built in a fuel cell vehicle (a fuel cell electric vehicle, and the like) as an on-vehicle fuel cell stack, for example, by stacking a predetermined number of power generation cells.

As regards a fuel cell vehicle, an on-board structure of a fuel cell system that is disclosed in Japanese Unexamined Patent Application Publication No. 2002-370544, for example, is known. The on-board structure includes a motor for driving an axle, a fuel cell for supplying electric power to the motor, a control unit for controlling operations of the motor and the fuel cell. Furthermore, the motor, the fuel cell, and the control unit are disposed inside the same vehicle body space of the electric vehicle while the control unit is disposed above the fuel cell and the motor is disposed below the fuel cell.

SUMMARY

According to one aspect of the present invention, an electric component connection mechanism of a fuel cell stack includes a fuel cell stack body, terminal plates, end plates, and a housing. A plurality of fuel cells that generate electricity by electrochemical reaction of a fuel gas and an oxidant gas are stacked in the fuel cell stack body. The terminal plates are disposed on both ends of the fuel cell stack body in a stacking direction of the fuel cells. The end plates are stacked on the terminal plates on the sides opposite to the fuel cell stack body. The housing surrounds surfaces of the fuel cell stack body other than surfaces on which the end plates are disposed. The housing is fixed to the end plates such that a constant distance is maintained between a pair of the end plates. The terminal plates include terminals that penetrate through and protrude out of the end plates. The terminals are connected to high-voltage cables. Moving mechanisms that support the terminal plates while allowing the terminal plates to advance and retreat in the stacking direction with respect to the end plates are provided.

According to another aspect of the present invention, a fuel cell stack includes a fuel cell stack body, a first terminal plate, a second terminal plate, a first end plate, a second end plate, a housing, a first moving mechanism, and a second moving mechanism. The fuel cell stack body includes fuel cells stacked in a stacking direction to generate electricity by electrochemical reaction of a fuel gas and an oxidant gas. The fuel cell stack body has a first end and a second end opposite to the first end in the stacking direction. The first terminal plate includes a first terminal to be connected to a first high-voltage cable. The first terminal plate is disposed on the first end of the fuel cell stack body in the stacking direction. The second terminal plate includes a second terminal to be connected to a second high-voltage cable. The second terminal plate is disposed on the second end of the fuel cell stack body in the stacking direction. The first end plate is stacked on the first terminal plate in the stacking direction. The first terminal of the first terminal plate extends through and protrudes from the first end plate in the stacking direction. The second end plate is stacked on the second terminal plate in the stacking direction. The second terminal of the second terminal plate extends through and protrudes from the second end plate in the stacking direction. The housing surrounds the fuel cell stack body and is fixed to the first end plate and the second end plate such that a constant distance is maintained between the first end plate and the second end plate in the stacking direction. The first moving mechanism supports the first terminal plate so that the first terminal plate is movable in the stacking direction with respect to the first end plate. The second moving mechanism supports the second terminal plate so that the second terminal plate is movable in the stacking direction with respect to the second end plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
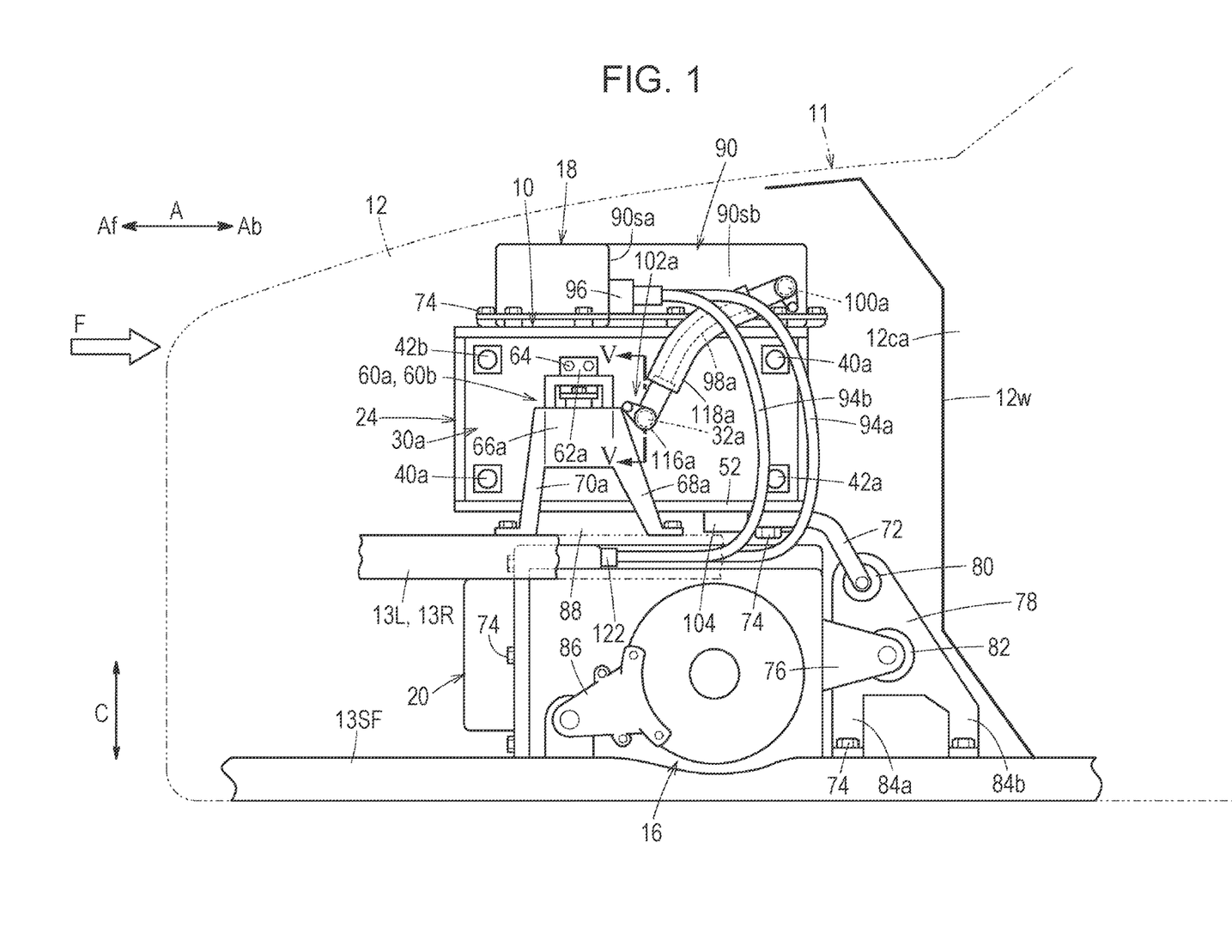
FIG. 1 is a schematic side view for describing a front side of a fuel cell electric vehicle in which an electrical component connection mechanism of a fuel cell stack according to an exemplary embodiment of the present disclosure is incorporated.
Figure 2:
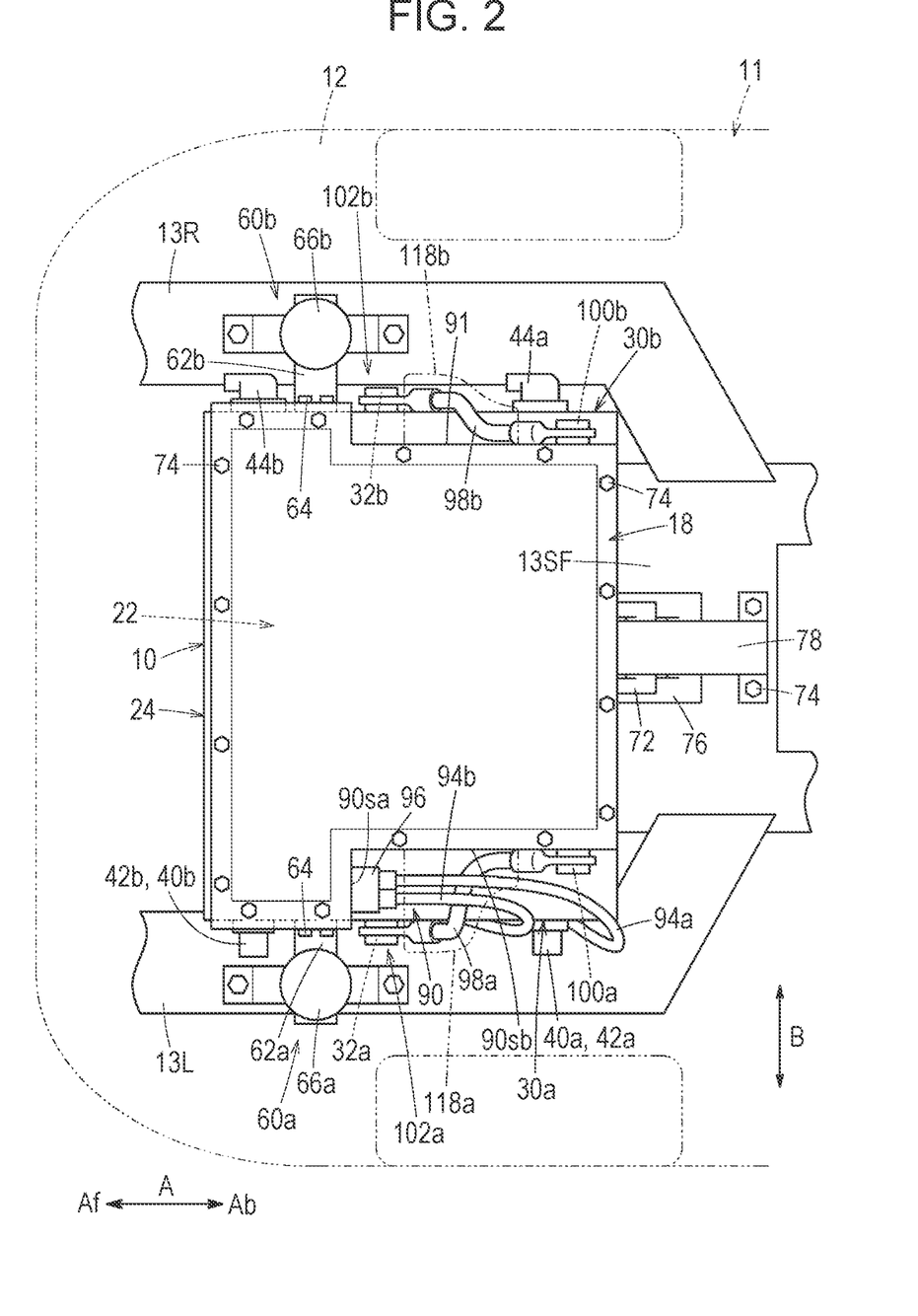
FIG. 2 is a schematic plan view for describing the fuel cell electric vehicle.

As illustrated in FIGS. 1 and 2, a fuel cell stack 10 according to an exemplary embodiment of the present disclosure is accommodated in a motor room (a front box) 12 that constitutes a fuel cell electric vehicle (a fuel cell vehicle) 11. The motor room 12 is provided so as to be separated from a vehicle interior 12ca with a partition member (a dashboard) 12w.

First vehicle frame portions (side frames, for example) 13R and 13L that constitute a vehicle body frame are provided in the motor room 12 so as to extend in an arrow A direction. A second vehicle frame portion (a cross member, for example) 13SF is provided below the first vehicle frame portions 13R and 13L so as to extend in the arrow A direction.

The fuel cell stack 10, a traction motor 16, a first controller (an electrical component) 18, and a second controller 20 are disposed in the motor room 12. Briefly, the fuel cell stack 10 is mounted on the first vehicle frame portions 13R and 13L, and the first controller 18 is disposed on an upper portion of the fuel cell stack 10 in the vertical direction (see FIGS. 1 and 3).

The traction motor 16, an axial direction of which extends in the vehicle width direction (an arrow B direction), is mounted on the second vehicle frame portion 13SF and is disposed at a portion below the fuel cell stack 10 in the vertical direction. The second controller 20 is disposed at a portion below the fuel cell stack 10 in the vertical direction and beside the traction motor 16.

Figure 3:
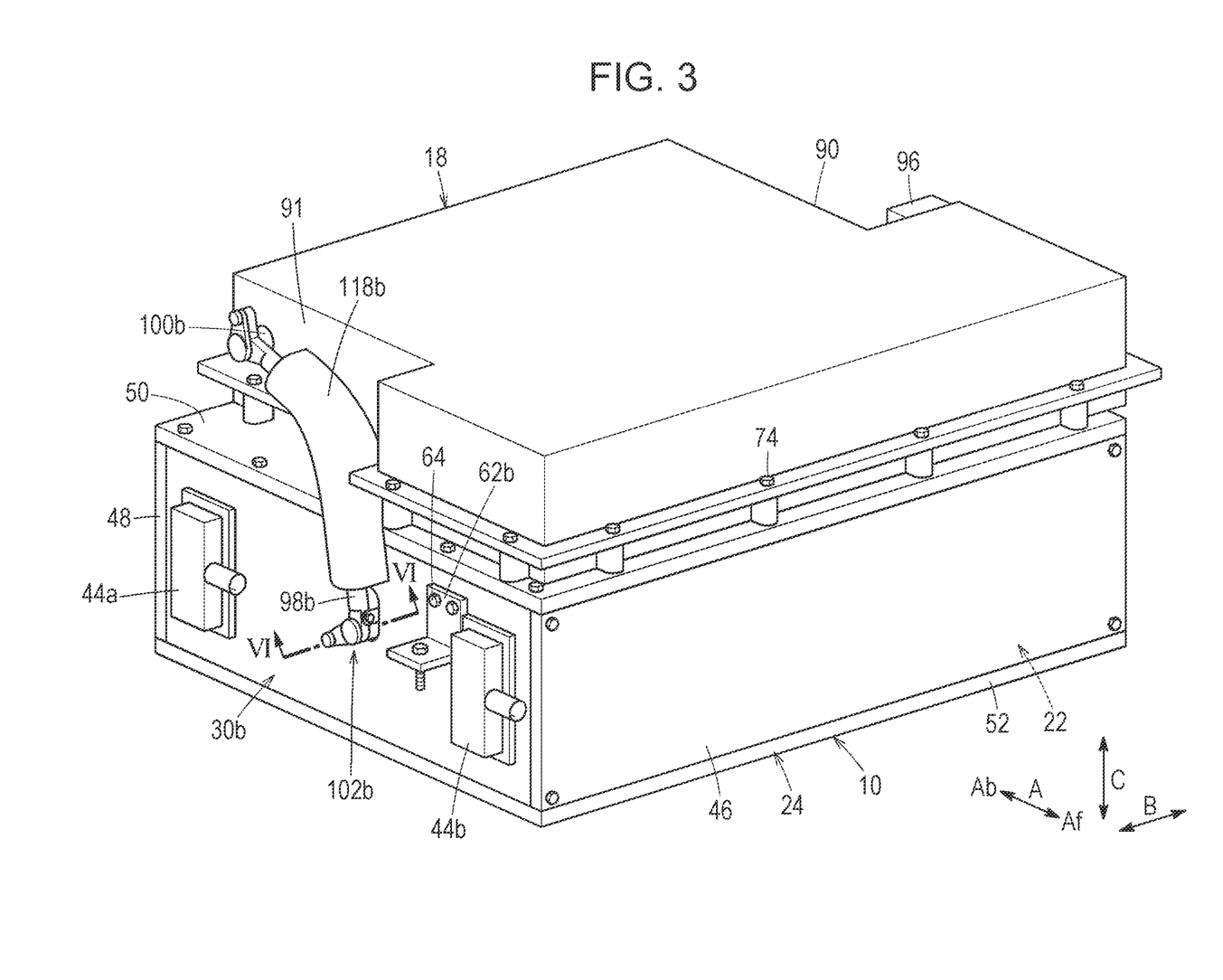
FIG. 3 is a perspective view of an essential portion of the fuel cell stack.
Figure 4:
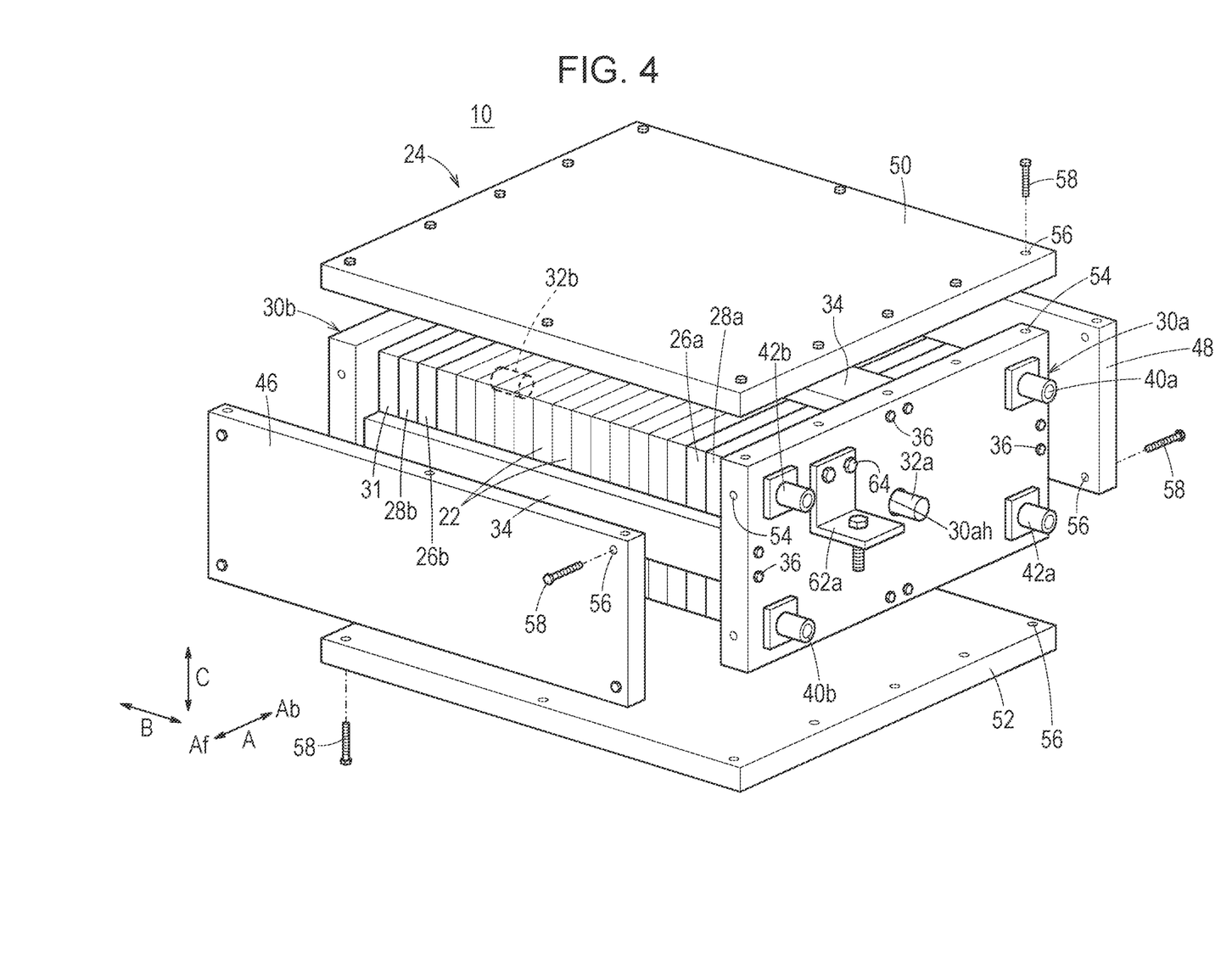
FIG. 4 is a partially exploded perspective view for describing the fuel cell stack.

As illustrated in FIGS. 2 to 4, the fuel cell stack 10 includes fuel cells 22 and a housing 24 that accommodates the stacked plurality of fuel cells 22. As illustrated in FIG. 4, the fuel cells 22 are stacked in the vehicle width direction (the arrow B direction) that traverses a vehicle length direction (a vehicle front-rear direction, or an arrow A direction) of the fuel cell electric vehicle 11 while the electrode surfaces are oriented upright.

A first terminal plate 26a, a first insulation plate (an insulator) 28a, and a first end plate 30a are sequentially disposed outwards at one end of the fuel cells 22 in a stacking direction. A second terminal plate 26b, a second insulation plate (an insulator) 28b, and a second end plate 30b are sequentially disposed outwards at the other end of the fuel cells 22 in the stacking direction. A spacer 31 for adjusting dimensional unevenness in the stacking direction is provided, as required, between the second insulation plate 28b and the second end plate 30b.

Figure 5:
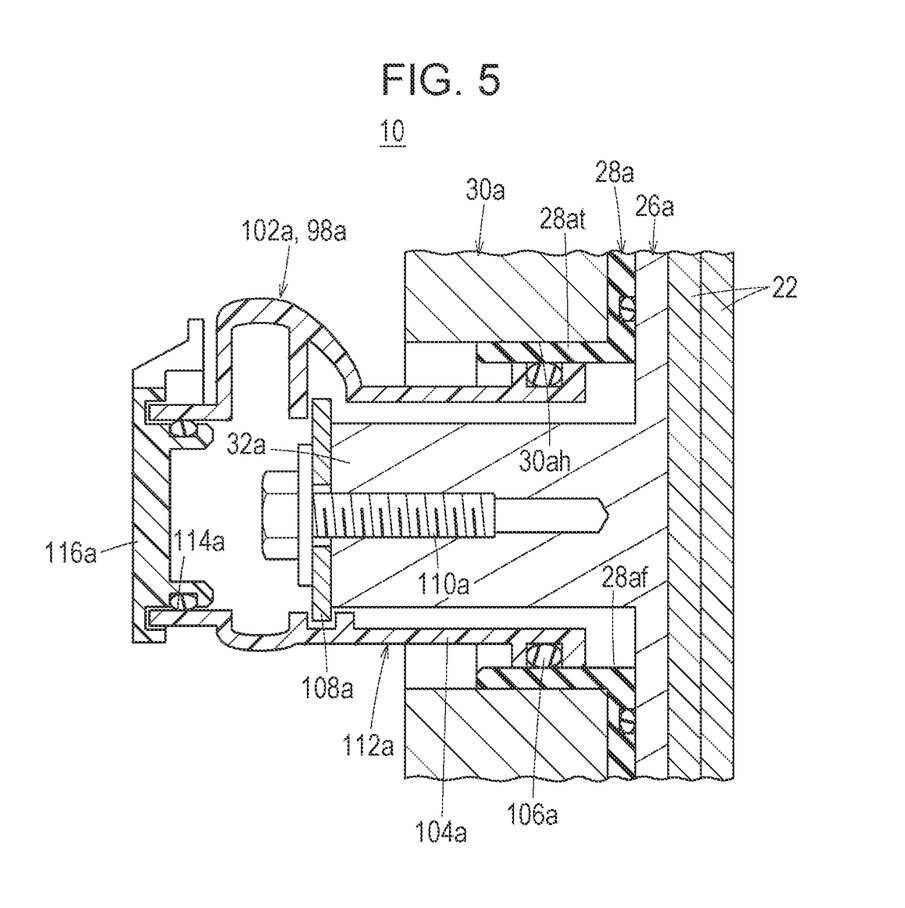
FIG. 5 is a cross-sectional view of the fuel cell stack taken along line V-V in FIG. 1.

A first electric power output terminal (a terminal) 32a that is connected to the first terminal plate 26a extends outwards from a first opening portion 30ah at a substantially center portion (may be deviated from the center portion) of the first end plate 30a having a laterally elongated shape (a rectangular shape) (see FIGS. 4 and 5). A second electric power output terminal (a terminal) 32b that is connected to the second terminal plate 26b extends outwards from a second opening portion 30bh at a substantially center portion of the second end plate 30b having a laterally elongated shape (a rectangular shape) (see FIG. 6). The second electric power output terminal 32b is configured longer in length than the first electric power output terminal 32a. A recess 30br is in communication with the second opening portion 30bh.

As illustrated in FIG. 5, the first insulation plate 28a is provided, in an integrated manner, with a cylindrical portion 28at that encircles the outer periphery of the first electric power output terminal 32a and that is inserted in the first opening portion 30ah of the first end plate 30a. An inner peripheral surface 28af is formed in the inner wall of the cylindrical portion 28at.

Figure 6:
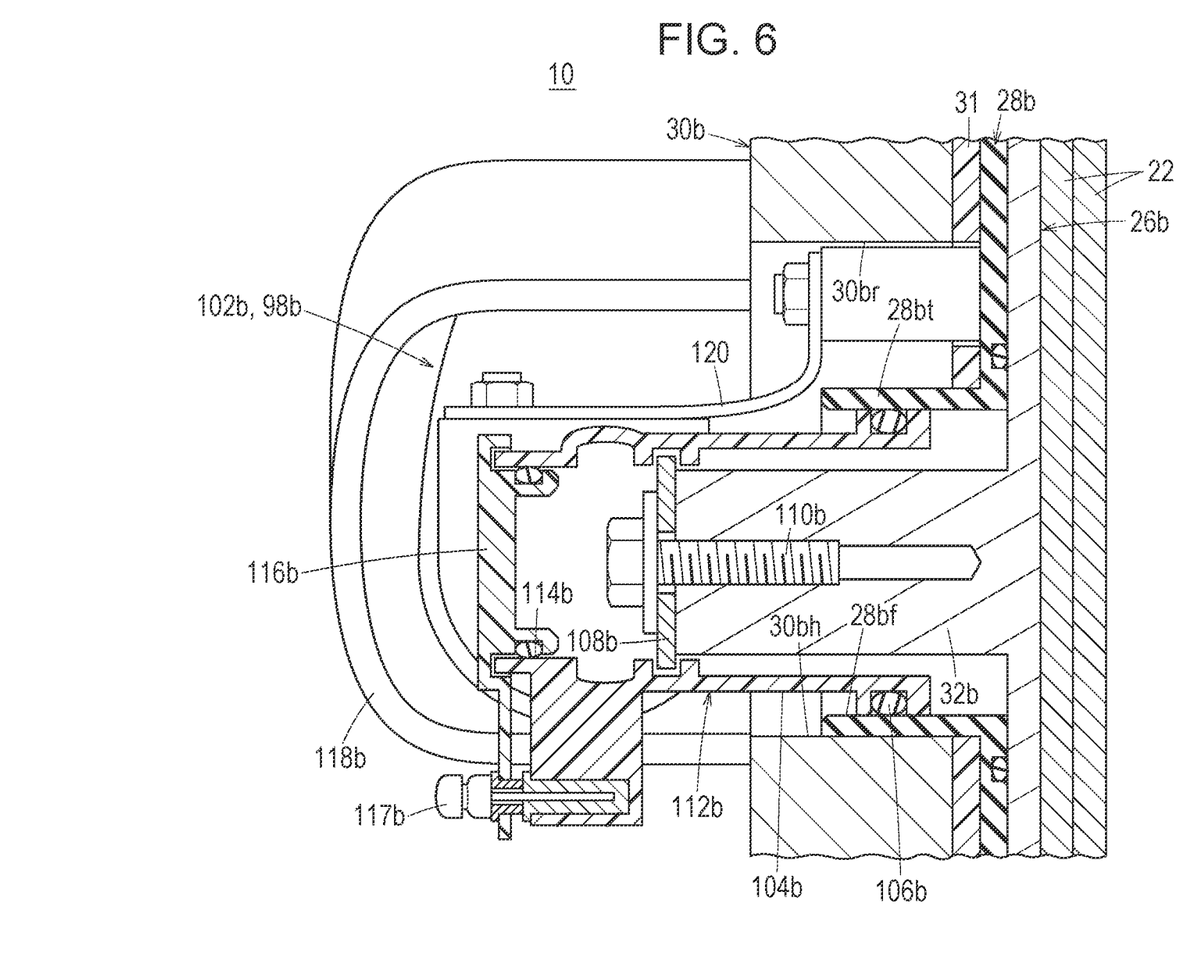
FIG. 6 is a cross-sectional view of the fuel cell stack taken along line VI-VI in FIG. 3.

As illustrated in FIG. 6, the second insulation plate 28b is provided, in an integrated manner, with a cylindrical portion 28bt that encircles the outer periphery of the second electric power output terminal 32b and that is inserted in the second opening portion 30bh of the second end plate 30b. An inner peripheral surface 28bf is formed in the inner wall of the cylindrical portion 28bt.

As illustrated in FIG. 4, connection bars 34 that each have a constant length are disposed between the corresponding sides of the first end plate 30a and the second end plate 30b and at the center positions of each sides. One end of each connection bar 34 is fixed to the first end plate 30a and the other end of each connection bar 34 is fixed to the second end plate 30b with screws 36 such that a tightening load is applied to the stacked plurality of fuel cells 22 and the stacking direction (the arrow B direction).

Although not shown, the fuel cells 22 each include an electrolyte membrane-electrode structure and a pair of separators that hold the electrolyte membrane-electrode structure in between. In the electrolyte membrane-electrode structure, a cathode electrode is provided on one side of the solid polymer electrolyte membrane and an anode electrode is provided on the other side of the solid polymer electrolyte membrane. An oxidant gas (air, for example) is supplied to the cathode electrode while a fuel gas (a hydrogen gas, for example) is supplied to the anode electrode, and electricity is generated through electrochemical reaction between the oxidant gas and the fuel gas.

An oxidant gas supplying manifold member 40a, an oxidant gas discharging manifold member 40b, a fuel gas supplying manifold member 42a, and a fuel gas discharging manifold member 42b are attached to the first end plate 30a. The oxidant gas supplying manifold member 40a, the oxidant gas discharging manifold member 40b, the fuel gas supplying manifold member 42a, and the fuel gas discharging manifold member 42b are each also referred to herein as reactant gas pipes. The oxidant gas supplying manifold member 40a supplies oxidant gas to the cathode electrode of each fuel cell 22, and the oxidant gas discharging manifold member 40b discharges the oxidant gas after use from each cathode electrode. The fuel gas supplying manifold member 42a supplies fuel gas to the anode electrode of each fuel cell 22, and the fuel gas discharging manifold member 42b discharges the fuel gas after use from each anode electrode.

As illustrated in FIGS. 2 and 3, a coolant supplying manifold member 44a and a coolant discharging manifold member 44b are attached to the second end plate 30b. The coolant supplying manifold member 44a and the coolant discharging manifold member 44b are each also referred to herein as coolant pipes. The coolant supplying manifold member 44a supplies the coolant along each of the fuel cells 22 or along a predetermined number of fuel cells 22, and the coolant discharging manifold member 44b discharges the coolant that has been used for cooling.

As illustrated in FIG. 4, the two sides (surfaces) at the two ends of the housing 24 in the vehicle width direction (the arrow B direction) are constituted by the first end plate 30a and the second end plate 30b. The two sides (surfaces) at the two ends of the housing 24 in the vehicle length direction (the arrow A direction) are constituted by a front side panel 46 and a rear side panel 48 that have laterally elongated plate shapes. The two sides (surfaces) at the two ends of the housing 24 in a vehicle height direction (an arrow C direction) are constituted by an upper side panel 50 and a lower side panel 52. The upper side panel 50 and the lower side panel 52 each have a laterally elongated plate shape.

The front side panel 46, the rear side panel 48, the upper side panel 50, and the lower side panel 52 are fixed by screwing, through the hole portions 56, screws 58 into screw holes 54 that are provided on the lateral portions of the first end plate 30a and the second end plate 30b.

As illustrated in FIGS. 1 and 2, the fuel cell stack 10 is provided with lateral mount portions 60a and 60b that support the fuel cell stack 10 and that fix the fuel cell stack 10 to the first vehicle frame portions 13R and 13L. As illustrated in FIGS. 1 and 4, the lateral mount portion 60a includes a plate member 62a that is bent in an L shape in cross-sectional view, and the plate member 62a is screwed and fixed to a portion on the forward side of the first end plate 30a in an arrow Af direction with a plurality of screws 64.

As illustrated in FIGS. 1 and 2, the lateral mount portion 60a includes a shock absorbing portion (a liquid seal mount) 66a that is fixed to one end of the fuel cell stack 10 in the vehicle width direction through the plate member 62a. The shock absorbing portion 66a includes two attachment portions 68a and 70a that attaches the shock absorbing portion 66a to the first vehicle frame portion 13L.

As illustrated in FIG. 2, the lateral mount portion 60b is configured in a similar manner to the configuration of the lateral mount portion 60a described above. The same components are attached with the same reference numerals while reference signs b are attached in place of reference signs a, and detailed descriptions of the components are omitted. The lateral mount portion 60b is screwed and fixed to the first vehicle frame portion 13R.

As illustrated in FIG. 1, one ends of a pair of rear mount portion 72 are fixed to a rear portion of the fuel cell stack 10 in the front-rear direction of the vehicle with screws 74. One end of a motor mount portion 76 is mounted on a rear portion of the traction motor 16 in the front-rear direction of the vehicle. The rear mount portion 72 and the motor mount portion 76 are integrated with the connecting mount portion 78, and the connecting mount portion 78 is screwed and fixed to the second vehicle frame portion 13SF.

The other end of the rear mount portion 72 is screwed and fixed to a portion on the upper end side of the connecting mount portion 78 through a rubber member 80. The other end of the motor mount portion 76 is screwed and fixed to a portion on the lower end side of the connecting mount portion 78 through a rubber member 82. Attaching portions 84a and 84b are provided in the lower portion of the connecting mount portion 78, and the attachment portions 84a and 84b are fixed to the second vehicle frame portion 13SF with screws 74.

A motor mount portion 86 is provided in a front portion of the traction motor 16 in the front-rear direction of the vehicle. The motor mount portion 86 is screwed and fixed to the second vehicle frame portion 13SF. A space 88 is formed between the lower surface of the fuel cell stack 10 and the upper surface of the traction motor 16.

The first controller 18 constitutes a voltage and current control unit (VCU) that controls the output of the fuel cell stack 10. The present disclosure relates to an electrical component connection mechanism for connecting the first controller 18 to the fuel cell stack 10. As illustrated in FIGS. 1 to 3, while being disposed in the upper surface area of the housing 24 constituting the fuel cell stack 10, the first controller 18 is fixed to the housing 24 with a plurality of screws 74.

As illustrated in FIG. 2, the first controller 18 is provided with a recess 90, which is a recess in which one end side of the first controller 18 in the vehicle width direction is cut out from the rear towards the front side. A lateral surface (a surface that extends in the arrow B direction) 90sa constituting the recess 90 is provided with a first connection 96 to which one of the ends of high-voltage cables 94a and 94b are connected.

A lateral surface (a surface that extends in the arrow A direction) 90sb constituting the recess 90 is provided with a connection terminal 100a to which one end of a high-voltage cable 98a is connected. The other end of the high-voltage cable 98a is connected to the first electric power output terminal 32a of the fuel cell stack 10 (see FIG. 1).

Figure 7:
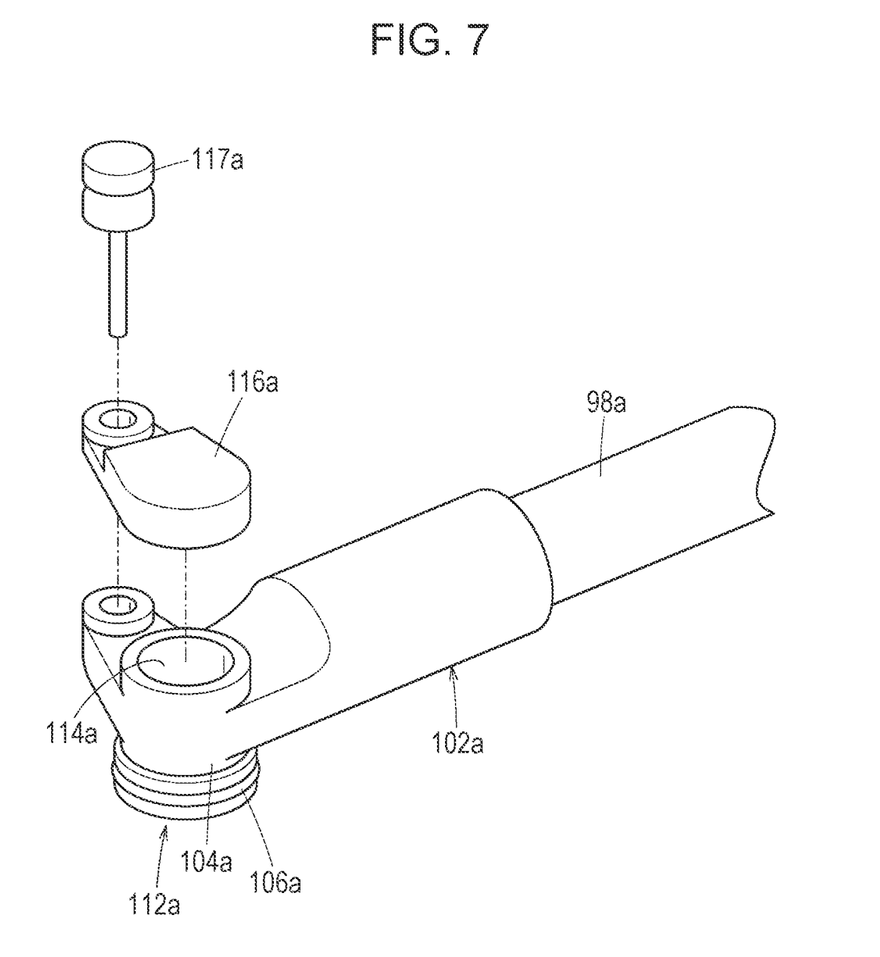
FIG. 7 is an exploded perspective view for describing a moving mechanism constituting the fuel cell stack.

A housing 102a is connected to an end portion of the high-voltage cable 98a. As illustrated in FIGS. 5 and 7, the housing 102a has a cylindrical shape and a piston portion 104a intersecting the housing 102a in the axial direction is formed in an integrated manner on the distal end side of the housing 102a. An O-ring 106a is disposed on the outer periphery of the piston portion 104a, and the piston portion 104a is slidably fitted to the inner peripheral surface 28af of the cylindrical portion 28at that constitutes the first insulation plate 28a.

The piston portion 104a is fixed to the first electric power output terminal 32a with a bolt (a connection portion) 110a that is screwed to the first electric power output terminal 32a while having a terminal 108a interposed between the piston portion 104a and the first electric power output terminal 32a. The terminal 108a is provided on the other end of the high-voltage cable 98a. The cylindrical portion 28at, the piston portion 104a, and a bolt 110a constitute the first moving mechanism 112a. The first moving mechanism 112a supports the first terminal plate 26a so as to allow the first terminal plate 26a to advance and retreat in the stacking direction with respect to the first end plate 30a.

As illustrated in FIG. 7, an opening portion 114a is formed in the distal end of the housing 102a coaxially with the piston portion 104a. A cover 116a is disposed on the opening portion 114a, and the cover 116a is fixed to the distal end of the housing 102a with a screw 117a. The high-voltage cable 98a is surrounded by a cylindrical protective cover 118a (see FIG. 1).

As illustrated in FIG. 2, the first controller 18 is provided with a recess 91, which is a recess in which the other end side of the first controller 18 in the vehicle width direction is cut out from the rear towards the front side. A lateral surface (a surface that extends in the arrow A direction) constituting the recess 91 is provided with a connection terminal 100b to which one end of a high-voltage cable 98b is connected (see FIG. 3). The other end of the high-voltage cable 98b is connected to the second electric power output terminal 32b of the fuel cell stack 10.

Note that the high-voltage cable 98b side is configured in a substantially similar manner to the configuration of the high-voltage cable 98a side described above and, hereinafter, will be described briefly.

A housing 102b is connected to an end portion of the high-voltage cable 98b. As illustrated in FIG. 6, a piston portion 104b is integrally formed on the distal end side of the housing 102b. An O-ring 106b is mounted on the outside of the piston portion 104b and, the piston portion 104b is slidably fitted to the inner peripheral surface 28bf of the cylindrical portion 28bt that constitutes the second insulation plate 28b.

The piston portion 104b is fixed to the second electric power output terminal 32b with a bolt (a connection portion) 110b that is screwed to the second electric power output terminal 32b while having a terminal 108b interposed between the piston portion 104b and the second electric power output terminal 32*b*. The terminal 108*b* is provided on the other end side of the high-voltage cable 98*b*. The cylindrical portion 28*bt*, the piston portion 104*b*, and a bolt 110*b* constitute the second moving mechanism 112*b*. The second moving mechanism 112*b* supports the second terminal plate 26*b* so as to allow the second terminal plate 26*b* to advance and retreat in the stacking direction with respect to the second end plate 30*b*.

An opening portion 114*b* is formed in the distal end of the housing 102*b* coaxially with the piston portion 104*b*. A cover 116*b* is disposed on the opening portion 114*b*, and the cover 116*b* is fixed to the distal end of the housing 102*b* with a screw 117*b*. The high-voltage cable 98*b* is surrounded by a cylindrical protective cover 118*b*.

One end of a detent stay 120 is screwed and fixed to the housing 102*b* and the other end of the detent stay 120 is screwed and fixed to the second insulation plate 28*b*. The detent stay 120 is received in the recess 30*br* of the second end plate 30*b*.

The second controller 20 constitutes a power control unit (PCU) that controls the electric power supplied to the traction motor 16. As illustrated in FIG. 1, the second controller 20 is fixed to the traction motor 16 with a plurality of screws 74. A second connection 122 to which the other ends of the high-voltage cables 94*a* and 94*b* are connected is provided in the upper portion of the second controller 20.

A cell voltage detection device 104 for detecting the cell voltage of the fuel cell stack 10 is mounted on the lower surface of the fuel cell stack 10. The cell voltage detection device 104 is disposed so as to be accommodated in the lower surface area (in the space 88) of the fuel cell stack 10.

An operation of the fuel cell stack 10 of the fuel cell electric vehicle 11 configured as above will be described below.

As illustrated in FIG. 4, first, gas containing oxygen, such as an oxidant gas, is supplied to the oxidant gas supplying manifold member 40*a* of the first end plate 30*a*. A fuel gas, such as gas containing hydrogen, is supplied to the fuel gas supplying manifold member 42*a* of the first end plate 30*a*. Meanwhile, as illustrated in FIG. 3, in the second end plate 30*b*, a coolant, such as pure water, ethylene glycol, or oil, is supplied to the coolant supplying manifold member 44*a*.

Accordingly, electricity is generated in each of the fuel cells 22 by electrochemical reaction between the oxidant gas supplied to the cathode electrode and the fuel gas supplied to the anode electrode. The fuel cells 22 are electrically connected in series and generated electric power is produced between the first electric power output terminal 32*a* and the second electric power output terminal 32*b* that are the two poles of the fuel cell stack 10.

The generated electric power is supplied to the first controller 18 through the high-voltage cable 98*a* connected to the first electric power output terminal 32*a* and the high-voltage cable 98*b* connected to the second electric power output terminal 32*b*. The first controller 18 performs voltage (and electric current) control and electric power is supplied to the second controller 20 that is electrically connected to the first controller 18 through the high-voltage cables 94*a* and 94*b*. In the second controller 20, a desired electric power is supplied to the traction motor 16 such that the fuel cell electric vehicle 11 is capable of being driven.

In the above case, in the present exemplary embodiment, the first end plate 30*a* and the second end plate 30*b* constitute the two sides at the two end of the housing 24 in the vehicle width direction and, accordingly, are maintained so as to have a constant clearance with respect to each other. Furthermore, in the first end plate 30*a*, the first terminal plate 26*a* is supported by the first moving mechanism 112*a* so as to be capable of advancing and retreating in the stacking direction. In a similar manner, in the second end plate 30*b*, the second terminal plate 26*b* is supported by the second moving mechanism 112*b* so as to be capable of advancing and retreating in the stacking direction.

For example, as illustrated in FIG. 6, the second moving mechanism 112*b* includes the piston portion 104*b* that is fixed to the second electric power output terminal 32*b*, and the piston portion 104*b* is slidably fitted to the cylindrical portion 28*bt* of the second insulation plate 28*b*. Accordingly, when unevenness in the stacking direction with respect to the second end plate 30*b* occurs in the stacked fuel cell stack, the second terminal plate 26*b* and the end portion of the high-voltage cable 98*b* can be moved in the stacking direction with respect to the second end plate 30*b*.

Meanwhile, in a similar manner, in the first moving mechanism 112*a* as well, the first terminal plate 26*a* and the end portion of the high-voltage cable 98*a* can be moved in the stacking direction with respect to the first end plate 30*a*. With the above, even if there is dimensional unevenness in the stacking direction, the first terminal plate 26*a* and the second terminal plate 26*b* are capable of effectively absorbing the dimensional unevenness by moving in the stacking direction.

Particularly, the second terminal plate 26*b* including the second electric power output terminal 32*b* is supported as if floating with respect to the second end plate 30*b*. In a similar manner, the first terminal plate 26*a* including the first electric power output terminal 32*a* is supported as if floating with respect to the first end plate 30*a*.

Accordingly, there is no need to perform an adjustment of the position of the overall fuel cell stack 10. With the above, with a simple configuration, the installation space of the overall system can be effectively narrowed and space efficiency can be favorably improved.

Furthermore, in the exemplary embodiment, the second electric power output terminal 32*b* of the second terminal plate 26*b* is configured so as to be longer in length than the first electric power output terminal 32*a* of the first terminal plate 26*a*. Accordingly, a portion around the first electric power output terminal 32*a* on the short length side protrudes out by a specific length from the first end plate 30*a* without being influenced by the unevenness in the stacking direction. Accordingly, space efficiency in the first end plate 30*a* side can be improved.

In the above case, the oxidant gas supplying manifold member 40*a*, the oxidant gas discharging manifold member 40*b*, the fuel gas supplying manifold member 42*a*, and the fuel gas discharging manifold member 42*b* are attached on the first end plate 30*a* side. Meanwhile, the coolant supplying manifold member 44*a* and the coolant discharging manifold member 44*b* are attached on the second end plate 30*b* side.

As described above, in the first end plate 30*a*, since the first electric power output terminal 32*a* on the short length side protrudes out, it will be possible dispose various auxiliary devices in the first end plate 30*a* with high space efficiency.

Furthermore, in the fuel cell stack 10, the fuel cells 22 are stacked in the vehicle width direction. With the above, the space inside the motor room 12 can be efficiently used when disposing the fuel cell stack 10.

In an electrical component connection mechanism of a fuel cell stack according to the present disclosure, the fuel cell stack includes a fuel cell in which a plurality of fuel cells that generate electricity by electrochemical reaction between a fuel gas and an oxidant gas are stacked. Terminal plates are disposed on both ends of the fuel cell in a stacking direction of the fuel cells and end plates are stacked on the terminal plates on the sides opposite to the fuel cell. The fuel cell stack includes a housing that surrounds surfaces of the fuel cell other than surfaces on which the end plates are disposed, in which the housing is fixed to the end plates such that a constant distance is maintained between a pair of the end plates.

Furthermore, the terminal plates include terminals that penetrating through and protrude out of the end plates and that are connected to high-voltage cables, and moving mechanisms that support the terminal plates while allowing the terminal plates to advance and retreat in the stacking direction with respect to the end plates.

Furthermore, a pair of the terminals preferably include a first terminal and a second terminal that has a length that is greater than that of the first terminal.

Moreover, the first terminal and a reactant gas pipe are preferably disposed in one of the end plates, and the second terminal and a coolant pipe are preferably disposed in the other one of the end plates.

Moreover, an insulator is preferably interposed between each end plate and the corresponding terminal plate. In such a case, the moving mechanisms each preferably include a cylindrical portion that is provided in the insulator and that encircles an outer periphery of the corresponding terminal. The moving mechanism preferably includes a piston portion that is connected to the corresponding high-voltage cable, that is capable of sliding on an inner surface of the corresponding cylindrical portion in an axial direction of the corresponding terminal, and that penetrate through the corresponding end plate, and a connection portion that connects the piston portion and the corresponding terminal to each other.

Still further, the fuel cell stack is preferably mounted on a vehicle, and the stacking direction of the fuel cells preferably coincides with a vehicle width direction.

According to the present disclosure, the pair of end plates are maintained at a constant clearance and the terminal plates are supported with the moving mechanisms so as to be capable of advancing and retreating in the stacking direction with respect to the end plates. Accordingly, even if there is dimensional unevenness in the stacking direction, the terminal plates can effectively absorb the dimensional unevenness by moving in the stacking direction.

In particular, the terminal plates including the terminals are supported as if floating with respect to the end plates; accordingly, adjustment of the position of the overall fuel cell stack is not needed. With the above, with a simple configuration, the installation space of the overall system can be effectively narrowed and space efficiency can be favorably improved.

Obviously, numerous modifications and variations of the present invention are possible in light of the above teachings. It is therefore to be understood that within the scope of the appended claims, the invention may be practiced otherwise than as specifically described herein.

What is claimed is:

1. An electric component connection mechanism of a fuel cell stack, comprising:
    a fuel cell stack body in which a plurality of fuel cells that generate electricity by electrochemical reaction of a fuel gas and an oxidant gas are stacked;
    terminal plates that are disposed on both ends of the fuel cell stack body in a stacking direction of the fuel cells;
    end plates that are stacked on the terminal plates on the sides opposite to the fuel cell stack body; and
    a housing that surrounds surfaces of the fuel cell stack body other than surfaces on which the end plates are disposed, the housing being fixed to the end plates such that a constant distance is maintained between a pair of the end plates, wherein
    the terminal plates include a first terminal and a second terminal that each penetrate through and protrude out of the end plates, the first terminal and the second terminal being connected to high-voltage cables,
    a first length of the first terminal in the stacking direction is smaller than a second length of the second terminal in the stacking direction to increase a space outside of the fuel cell stack which surrounds the first terminal protruding out of one of the end plates and which is defined by the one of the end plates,
    a reactant gas pipe through which reactant gas is to flow is attached to the one of the end plates in the space,
    moving mechanisms that support the terminal plates while allowing the terminal plates to advance and retreat in the stacking direction with respect to the end plates are provided,
    an insulator is interposed between each end plate and the corresponding terminal plate,
    the moving mechanisms each include
        a cylindrical portion that is provided in the insulator and that encircles an outer periphery of the corresponding terminal,
        a piston portion that is connected to the corresponding high-voltage cable, the piston portion being capable of sliding on an inner surface of the corresponding cylindrical portion in an axial direction of the corresponding terminal and penetrating through the corresponding end plate, and
        a connection portion that connects the piston portion and the corresponding terminal to each other, and
    the piston portion being integrally formed on a cable connector housing provided around the connection portion, the cable connector housing having an opening to allow access to the connection portion, a cover being disposed on the opening, the cover being fixed to the cable connector housing by a fastener fastened to the cable connector housing.

2. The electrical component connection mechanism according to claim 1, wherein
    the second terminal and a coolant pipe are disposed in the other one of the end plates.

3. The electrical component connection mechanism according to claim 1, wherein
    the fuel cell stack is configured to be mounted in a vehicle such that the stacking direction of the fuel cells coincides with a vehicle width direction.

4. A fuel cell stack comprising:
    a fuel cell stack body including fuel cells stacked in a stacking direction to generate electricity by electrochemical reaction of a fuel gas and an oxidant gas, the fuel cell stack body having a first end and a second end opposite to the first end in the stacking direction;
    a first terminal plate including a first terminal to be connected to a first high-voltage cable, the first terminal plate being disposed on the first end of the fuel cell stack body in the stacking direction;
    a second terminal plate including a second terminal to be connected to a second high-voltage cable, the second terminal plate being disposed on the second end of the fuel cell stack body in the stacking direction;

a first end plate stacked on the first terminal plate in the stacking direction, the first terminal of the first terminal plate extending through an opening in the first end plate and protruding from the first end plate in the stacking direction;

a second end plate stacked on the second terminal plate in the stacking direction, the second terminal of the second terminal plate extending through and protruding from the second end plate in the stacking direction;

a housing surrounding the fuel cell stack body and fixed to the first end plate and the second end plate such that a constant distance is maintained between the first end plate and the second end plate in the stacking direction;

a first moving mechanism supporting the first terminal plate so that the first terminal plate is movable in the stacking direction with respect to the first end plate; and a second moving mechanism supporting the second terminal plate so that the second terminal plate is movable in the stacking direction with respect to the second end plate, wherein the first moving mechanism includes:
  a cylindrical portion of an insulator that encircles an outer periphery of the first terminal and extends within the opening in the first end plate;
  a piston portion that is connected to the first high-voltage cable, the piston portion being slidably provided on an inner surface of the cylindrical portion in an axial direction of the first terminal, the piston portion extending within the opening of the first end plate, and
  a connection portion that connects the piston portion and the first terminal to each other; and wherein the piston portion is integrally formed on a cable connector housing provided around the connection portion, the cable connector housing having an opening to allow access to the connection portion, a cover being disposed on the opening of the cable connector housing, the cover being fixed to the cable connector housing by a fastener fastened to the cable connector housing.

5. The fuel cell stack according to claim 4, wherein the fuel cell stack is configured to be mounted in a vehicle such that the stacking direction of the fuel cells coincides with a vehicle width direction.

6. The fuel cell stack according to claim 4, wherein
wherein a first length of the first terminal in the stacking direction is smaller than a second length of the second terminal in the stacking direction to increase a space which surrounds the first terminal and which is defined by the first end plate, and wherein a reactant gas pipe through which reactant gas is to flow is attached to the first end plate in the space.

7. The fuel cell stack according to claim 6, wherein
the second terminal and a coolant pipe are disposed in the second end plate.

8. An electric component connection mechanism of a fuel cell stack, comprising:
  a fuel cell stack body in which a plurality of fuel cells that generate electricity by electrochemical reaction of a fuel gas and an oxidant gas are stacked;
  terminal plates that are disposed on both ends of the fuel cell stack body in a stacking direction of the fuel cells;
  end plates that are stacked on the terminal plates on the sides opposite to the fuel cell stack body;
  a housing that surrounds surfaces of the fuel cell stack body other than surfaces on which the end plates are disposed, the housing being fixed to the end plates such that a constant distance is maintained between a pair of the end plates; and
  moving mechanisms that support the terminal plates while allowing the terminal plates to advance and retreat in the stacking direction with respect to the end plates are provided, wherein
  a first terminal plate of the terminal plates includes a first terminal that extends through an opening in a first end plate of the end plates, the first terminal protrudes outward from the first end plate in the stacking direction away from the fuel cell stack body, the first terminal being connected to a high-voltage cable,
  the moving mechanisms each include:
    a cylindrical portion of an insulator that encircles an outer periphery of the first terminal and extends within the opening in the first end plate;
    a piston portion that is connected to the high-voltage cable, the piston portion being slidably provided on an inner surface of the cylindrical portion in an axial direction of the first terminal, the piston portion extending within the opening of the first end plate, and
    a connection portion that connects the piston portion and the first terminal to each other; and
  the piston portion is integrally formed on a cable connector housing provided around the connection portion, the cable connector housing having an opening to allow access to the connection portion, a cover being disposed on the opening of the cable connector housing, the cover being fixed to the cable connector housing by a fastener fastened to the cable connector housing.

* * * * *